(12) United States Patent
Horiuchi et al.

(10) Patent No.: US 6,539,813 B1
(45) Date of Patent: Apr. 1, 2003

(54) THROTTLE STRUCTURE AND FLOW METER INCORPORATED WITH THROTTLE STRUCTURE

(75) Inventors: Toru Horiuchi, Higashimurayama (JP); Kenji Shinozaki, Koshigaya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/711,955

(22) Filed: Nov. 15, 2000

(30) Foreign Application Priority Data

Nov. 15, 1999 (JP) .......................................... 11-324449

(51) Int. Cl.$^7$ ................................................ G01F 1/22
(52) U.S. Cl. ................................................ 73/861.53
(58) Field of Search ........................ 73/861.53, 861.61, 73/861.52, 118, 861.74, 861.62, 721; 156/73.1; 128/725

(56) References Cited

U.S. PATENT DOCUMENTS

| | | | | |
|---|---|---|---|---|
| 4,211,199 A | * | 7/1980 | Wolber ........................ 73/721 |
| 4,250,745 A | * | 2/1981 | Blatter et al. .................. 73/118 |
| 4,750,370 A | * | 6/1988 | Ossyra ..................... 73/861.61 |
| 5,086,655 A | * | 2/1992 | Fredericks et al. ...... 73/861.61 |
| 5,383,470 A | * | 1/1995 | Kolbly ........................ 128/725 |
| 5,820,715 A | * | 10/1998 | Singleterry et al. ........ 156/73.1 |

* cited by examiner

Primary Examiner—Benjamin R. Fuller
Assistant Examiner—Jewel V. Thompson
(74) Attorney, Agent, or Firm—Paul A. Guss

(57) ABSTRACT

A flow meter for measuring a flow rate of a fluid passing through a fluid passage is provided with a throttle structure disposed at the inside, and it is connected to the fluid passage. The fluid passes through a groove via expanded grooves formed on a surface of a substrate which constitutes the throttle structure. The flow rate of the fluid passing through the fluid passage can be measured by detecting pressures and temperatures of said fluid on an inflow side and an outflow side concerning the throttle structure.

11 Claims, 17 Drawing Sheets

PRIOR ART

THROTTLE STRUCTURE AND FLOW METER INCORPORATED WITH THROTTLE STRUCTURE

BACKGROUND OF THE INVENTION

1. Field of the Invention

The present invention relates to a throttle structure for allowing a fluid to flow therethrough, and a flow meter incorporated with the throttle structure, for measuring a flow rate of a fluid passing through a fluid passage by the aid of the incorporated throttle structure.

2. Description of the Related Art

A flow meter for measuring the flow rate of a fluid passing through a fluid passage is generally used, which is represented by a flow meter incorporated therein with a throttle structure for allowing the fluid to pass therethrough, for example, an orifice 1 made of stainless steel as shown in FIG. 17. The orifice 1 has a minute hole 2 which is formed as a fluid passage having a diameter of 10 $\mu$m to 20 $\mu$m. The minute flow rate of the fluid passing through the fluid passage connected with the flow meter can be measured, for example, by detecting the temperatures and the pressures on the inflow side and on the outflow side of the orifice 1.

However, when the minute hole 2 of 10 $\mu$m to 20 $\mu$m is formed for the conventionally used orifice 1 by means of machining, it is necessary to perform complicated working steps. Further, an inconvenience arises such that the dimensional error of the hole 2 is increased. Furthermore, a difficult problem arises such that the production cost is expensive. For example, the failure of correct measurement of the flow rate of a fluid or a process fluid to be used for an apparatus for producing semiconductor parts causes a factor to produce defective parts, which makes it extremely difficult to produce products required to have strict qualities.

SUMMARY OF THE INVENTION

A general object of the present invention is to provide a throttle structure which makes it possible to conveniently machine a fluid passage for allowing a fluid to pass therethrough and which makes it possible to prevent the occurrence of the dimensional error of the fluid passage as less as possible.

A principal object of the present invention is to provide a flow meter incorporated with a throttle structure which makes it possible to correctly measure the flow rate of a fluid passing through the throttle structure.

Another object of the present invention is to provide a throttle structure and a flow meter incorporated with the throttle structure which make it possible to achieve the inexpensive production cost of the throttle structure and the flow meter incorporated with the throttle structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
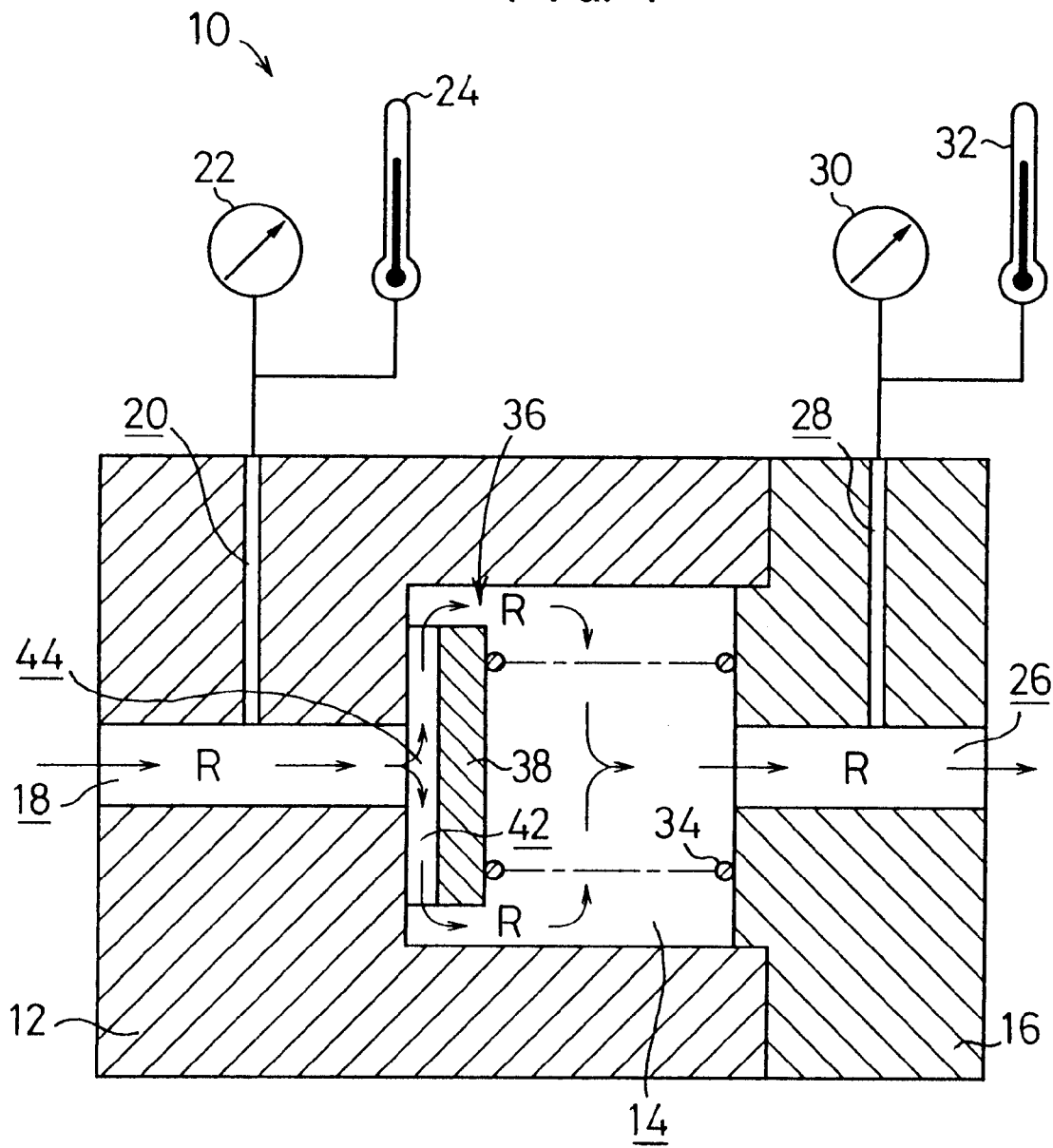
FIG. 1 shows a longitudinal sectional view illustrating a flow meter according to a first embodiment.

As shown in FIG. 1, a flow meter 10 according to a first embodiment of the present invention has a casing 12. A lid 16 is fastened to the casing 12 in order that an opening provided for the casing 12 is closed to define a chamber 14 at the inside of the casing 12.

An inlet side fluid passage 18 for supplying a fluid R to the chamber 14 is provided at a substantially central portion of the casing 12 in the longitudinal direction. The fluid R, which has passed through the inlet side fluid passage 18, arrives at the chamber 14.

An inlet side detecting fluid passage 20 is formed in a direction perpendicular to the inlet side fluid passage 18 at the inside of the casing 12. The inlet side detecting fluid passage 20 is connected to a pressure gauge 22 and a thermometer 24 for detecting the pressure and the temperature of the fluid R until the arrival at the chamber 14. The pressure gauge 22 and the thermometer 24 are connected to an unillustrated flow rate-measuring equipment.

An outlet side fluid passage 26, which is concentric with the inlet side fluid passage 18 and which is used to discharge the fluid R from the flow meter 10, is formed at a substantially central portion of the lid 16. The fluid R, which has passed through the outlet side fluid passage 26, is discharged from the flow meter 10.

An outlet side detecting fluid passage 28 is formed in a direction perpendicular to the outlet side fluid passage 26 at the inside of the lid 16. The outlet side detecting fluid passage 28 is connected to a pressure gauge 30 and a thermometer 32 for detecting the pressure and the temperature of the fluid R having passed through the chamber 14. The pressure gauge 30 and the thermometer 32 are connected to the unillustrated flow rate-measuring equipment, in the same manner as the pressure gauge 22 and the thermometer 24.

A coil-shaped spring 34 is provided at the inside of the chamber 14. A first end of the spring 34 is seated on a first side surface of the lid 16, and a second end of the spring 34 is seated on a first end surface of a throttle structure 36 which is incorporated in the flow meter 10 for allowing the fluid R to pass therethrough.

Figure 2:
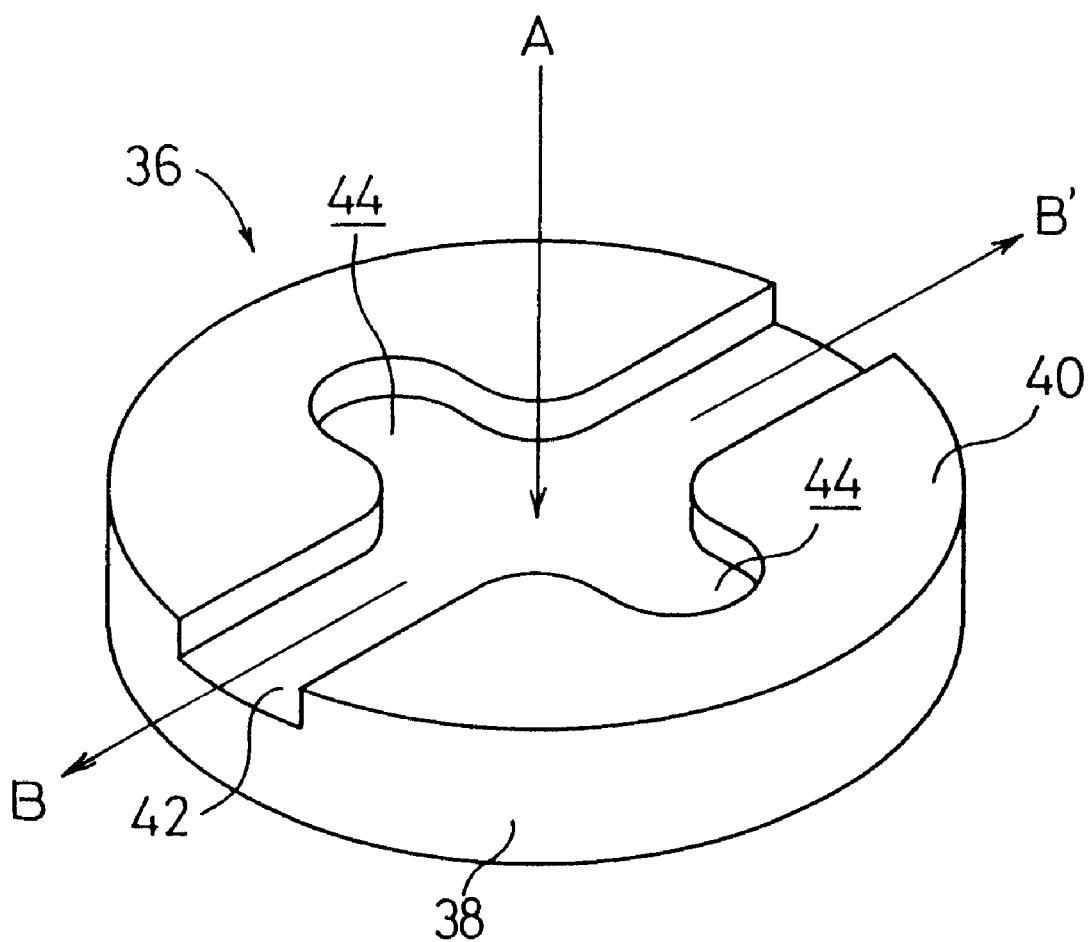
FIG. 2 shows a perspective view illustrating a throttle structure according to the first embodiment.

Next, the throttle structure 36 according to the first embodiment will be explained. As shown in FIG. 2, a circular flat plate made of stainless steel is used as a substrate 38 for the throttle structure 36. A groove 42 having a relatively narrow width, which extends in the diametral direction, is formed by means of etching on a surface 40 of the substrate 38. Similarly, semicircular expanded grooves 44 are provided integrally with the groove 42 by means of etching in a direction perpendicular to the groove 42 at central portions of the groove 42.

The formation of the groove 42 and the expanded grooves 44 by means of the etching makes it possible to conveniently machine the groove 42 and the expanded grooves 44. It is possible to prevent the occurrence of any dimensional error as less as possible, and it is possible to reduce the production cost.

The flow meter 10 according to the first embodiment is basically constructed as described above. Next, its function and effect will be explained.

The fluid R is supplied to the inlet side fluid passage 18 which is provided for the casing 12 of the flow meter 10 connected to the fluid passage. The fluid R arrives at the throttle structure 36 which is provided at the inside of the chamber 14 formed in the casing 12.

The fluid R, which has arrived at the throttle structure 36, passes through the groove 42 in the direction of the arrow A and in the directions of the arrows B and B' as shown in FIG. 2 via the expanded grooves 44 formed on the surface 40 of the substrate 38 which constitutes the throttle structure 36. During this process, the fluid R temporarily stays in the expanded grooves 44. Accordingly, the flow of the fluid R is adjusted, and the fluid R can smoothly pass through the groove 42 in the direction of the arrow A and in the directions of the arrows B and B'.

The fluid R, which has passed through the throttle structure 36, passes through the inside of the chamber 14, and it is discharged to the outside of the flow meter 10 from the outlet side fluid passage 26 which is formed in the lid 16 for defining the chamber 14 together with the casing 12.

The throttling effect is achieved for the fluid R owing to the passage through the groove 42 and the expanded grooves 44 which constitute the throttle structure 36. Accordingly, the pressure energy of the fluid R is converted into the kinetic energy, and the pressure value of the fluid R is changed between the inflow side and the outflow side of the throttle structure 36. During this process, the pressures and the temperatures are detected by the pressure gauges 22, 30 and the thermometers 24, 32 which are arranged for the front portion and the rear portion of the throttle structure 36. The data values of the detected pressures and temperatures are transmitted to the unillustrated flow rate-measuring equipment. The flow rate of the fluid passing through the fluid passage is measured on the basis of the data values.

For example, if the fluid R is a gas, and its flow rate is subsonic, then the flow rate is measured in accordance with the following expression (1).

$$Q = 3.77 S \sqrt{P_L(P_H - P_L)} \sqrt{\frac{273}{T}} \quad (1)$$

In the expression (1), Q represents the volume flow rate (1/second), S represents the effective cross-sectional area (mm$^2$) of the groove 42 formed on the throttle structure 36, $P_H$ represents the pressure on the inflow side (MPa, abs), $P_L$ represents the pressure on the outflow side (MPa, abs), and T represents the fluid temperature on the outflow side (K).

Next, modified embodiments of the throttle structure 36 to be used in the first embodiment will be explained with reference to FIGS. 3 and 4. The same constitutive components as the constitutive components of the throttle structure 36 of the first embodiment are designated by the same reference numerals, detailed explanation of which will be omitted.

Figure 3:
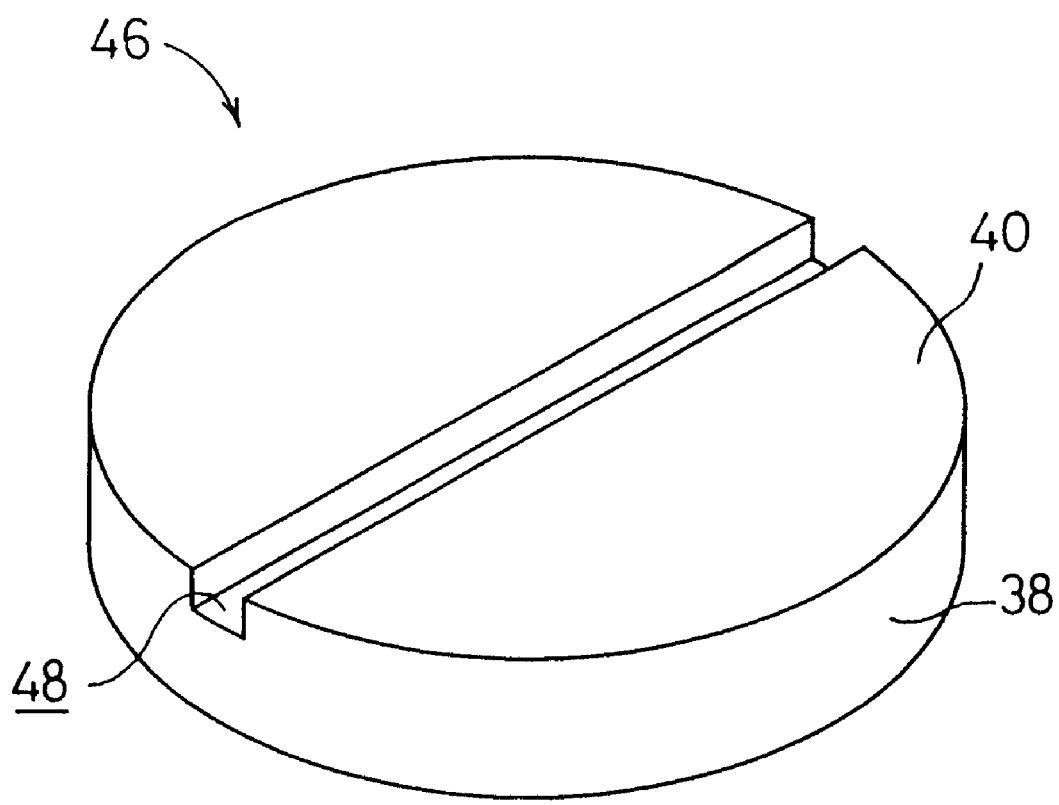
FIG. 3 shows a perspective view illustrating a first modified embodiment of the throttle structure according to the first embodiment.
Figure 4:
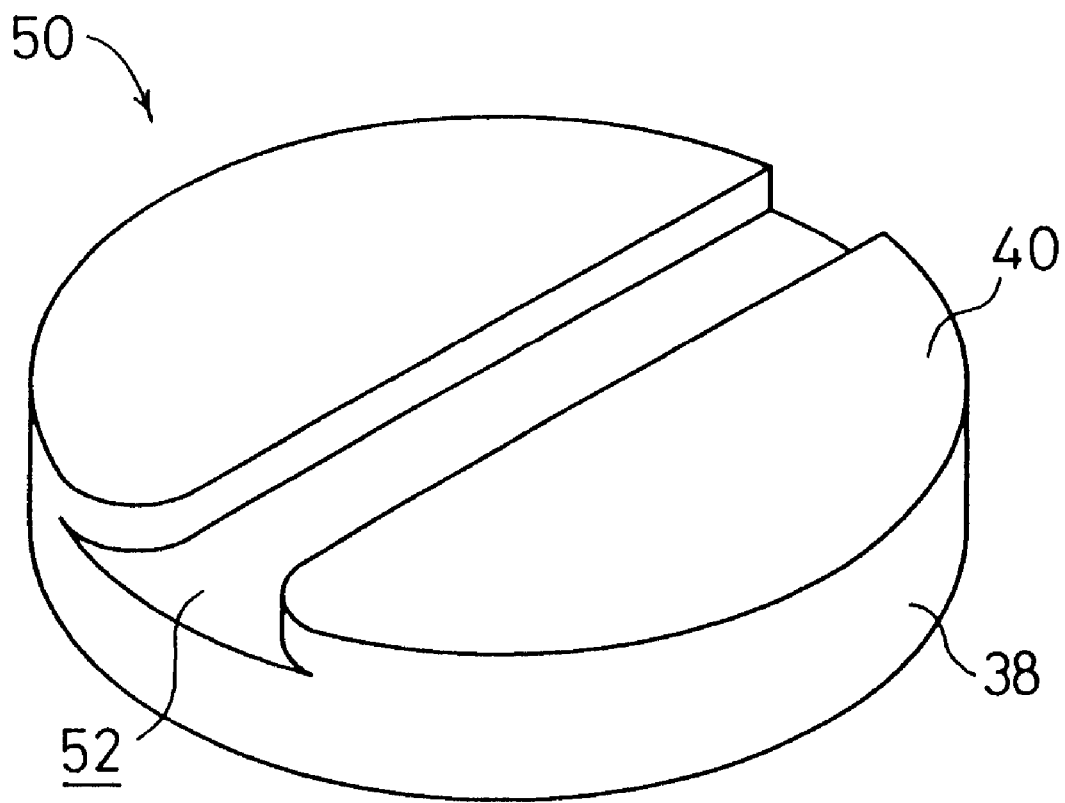
FIG. 4 shows a perspective view illustrating a second modified embodiment of the throttle structure according to the first embodiment.

In the first modified embodiment 46, as shown in FIG. 3, a groove 48, which extends in the diametric direction on a surface 40 of a substrate 38, is formed by means of etching. In the second modified embodiment 50, as shown in FIG. 4, a groove 52, which extends in the diametric direction on a surface 40 of a substrate 38 and which has its expanded first end, is formed by means of etching.

The first and second modified embodiments 46, 50 can be also used for a flow meter 54 according to a second embodiment described below.

Next, the flow meter 54 according to the second embodiment of the present invention will be explained with reference to FIGS. 5 and 6. The same constitutive components of the flow meter 54 according to the second embodiment as the constitutive components of the flow meter 10 according to the first embodiment are designated by the same reference numerals, detailed explanation of which is omitted. The description will be made for the following embodiments in the same manner as described above.

The flow meter 54 according to the second embodiment is constructed in approximately the same manner as the flow meter 10 according to the first embodiment. However, the former is different from the latter in the direction in which the fluid R passes through the throttle structure 36.

Figure 5:
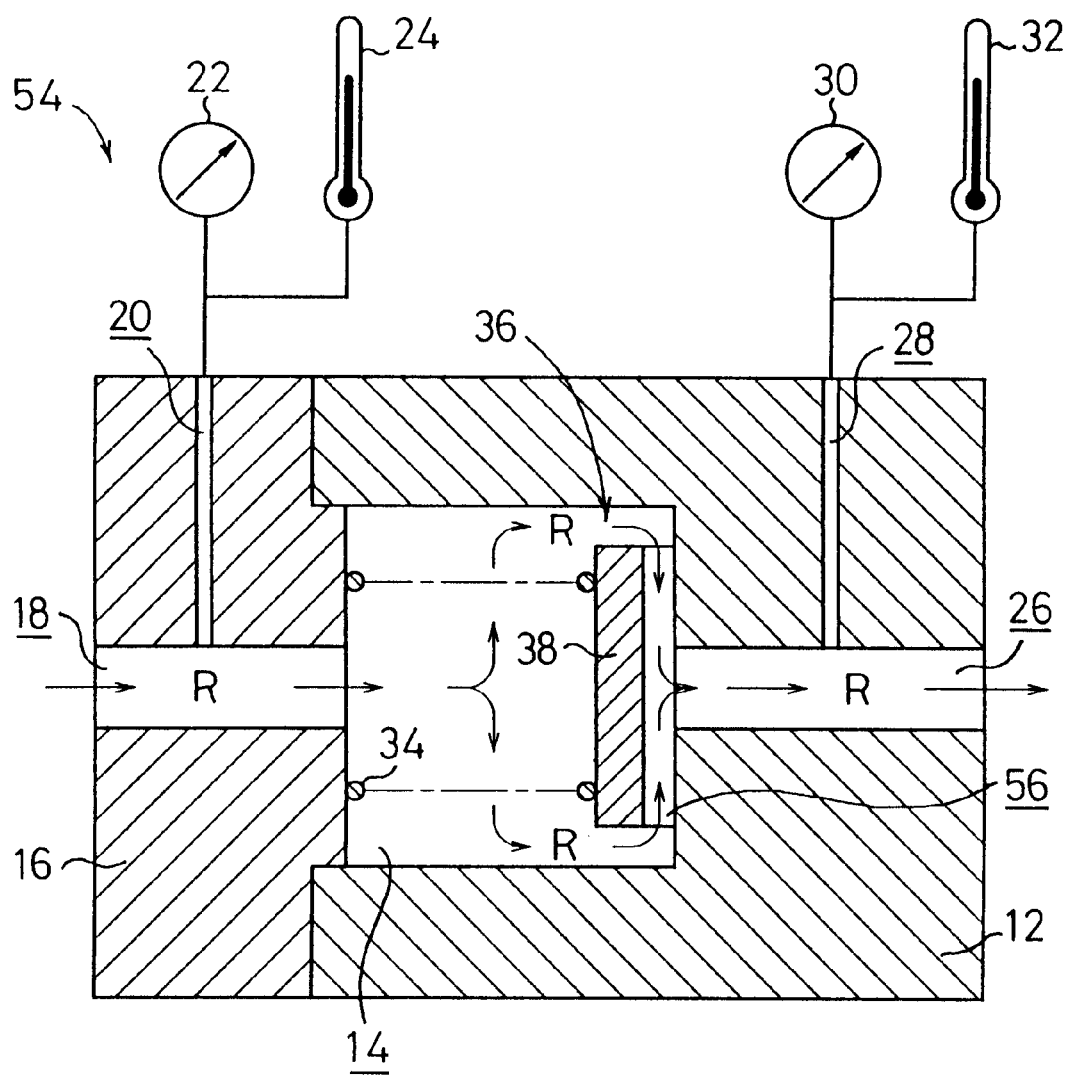
FIG. 5 shows a longitudinal sectional view illustrating a flow meter according to a second embodiment.

As shown in FIG. 5, the flow meter 54 includes an inlet side fluid passage 18 which is provided in a lid 16 for supplying the fluid R to a chamber 14. An outlet side fluid passage 26 for discharging the fluid R from the flow meter 54 is formed in a casing 12. A throttle structure 36 is incorporated at the inside of the flow meter 54. As shown in FIG. 6, a groove 56, which extends in the diametric direction and which has its both expanded ends, is formed by means of etching on a surface 40 of a substrate 38 of the throttle structure 36.

Figure 6:
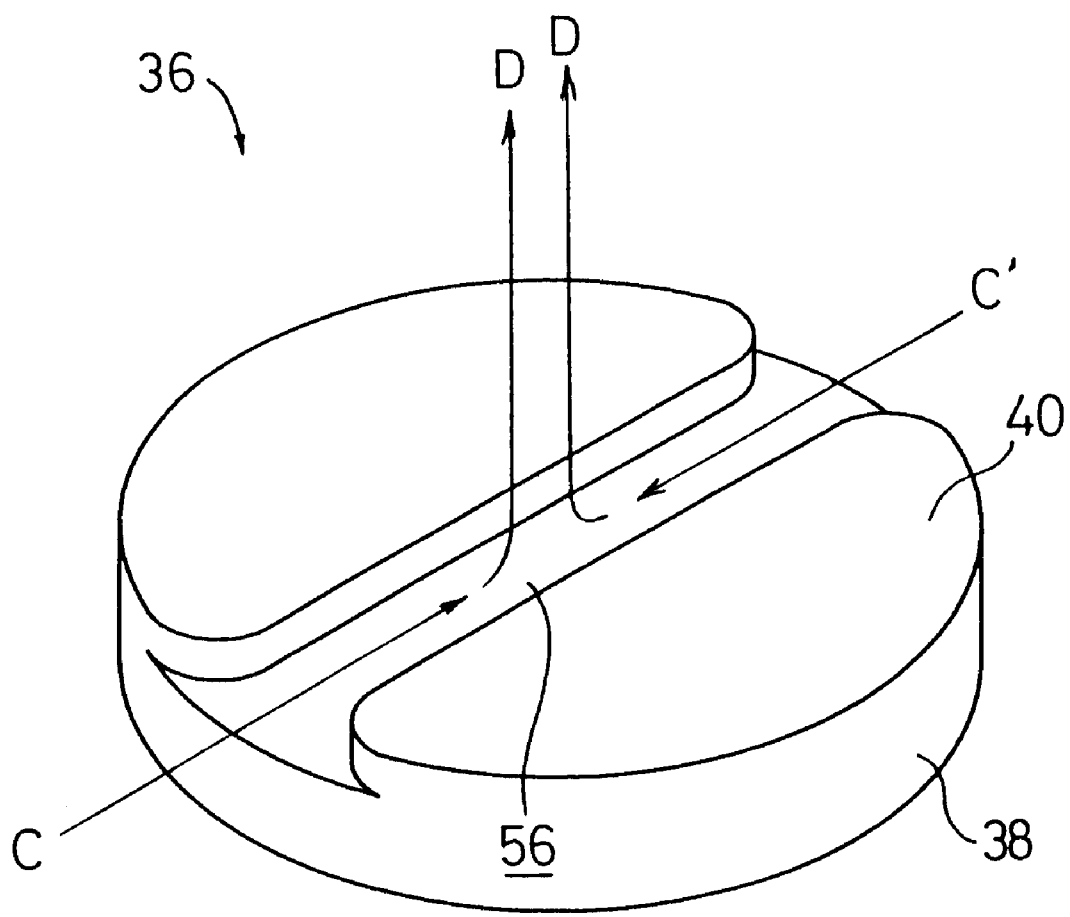
FIG. 6 shows a perspective view illustrating a throttle structure according to the second embodiment.

Therefore, the fluid R passes through the groove 56 formed on the surface 40 of the substrate 38 for constructing the throttle structure 36, in the directions of the arrows C and C' and in the direction of the arrow D as shown in FIG. 6.

The function and the effect of the flow meter 54 according to the second embodiment are substantially the same as the function and the effect of the flow meter 10 according to the first embodiment.

Figure 7:
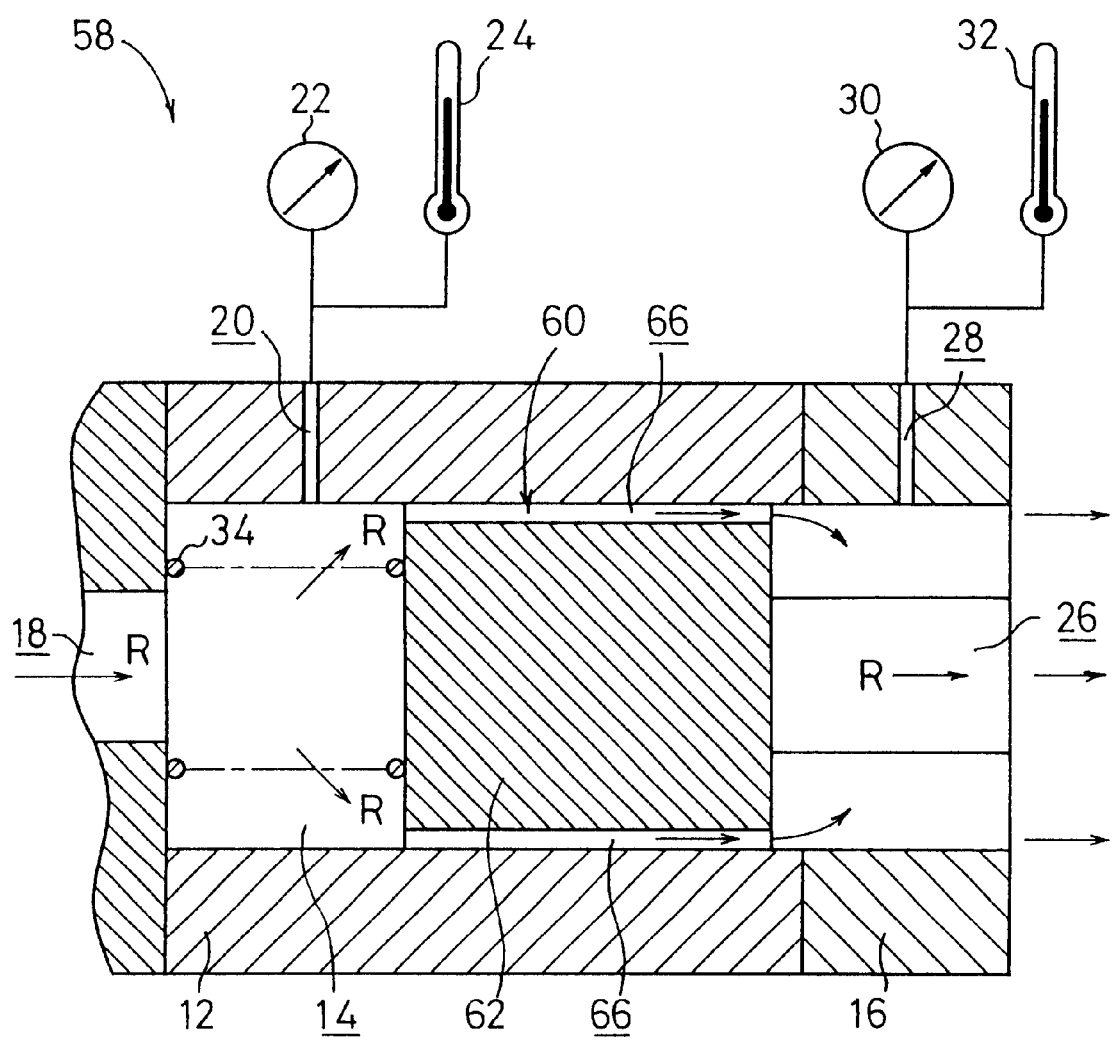
FIG. 7 shows a longitudinal sectional view illustrating a flow meter according to a third embodiment.

Next, a flow meter 58 according to a third embodiment of the present invention will be explained with reference to FIGS. 7 and 8.

Figure 8:
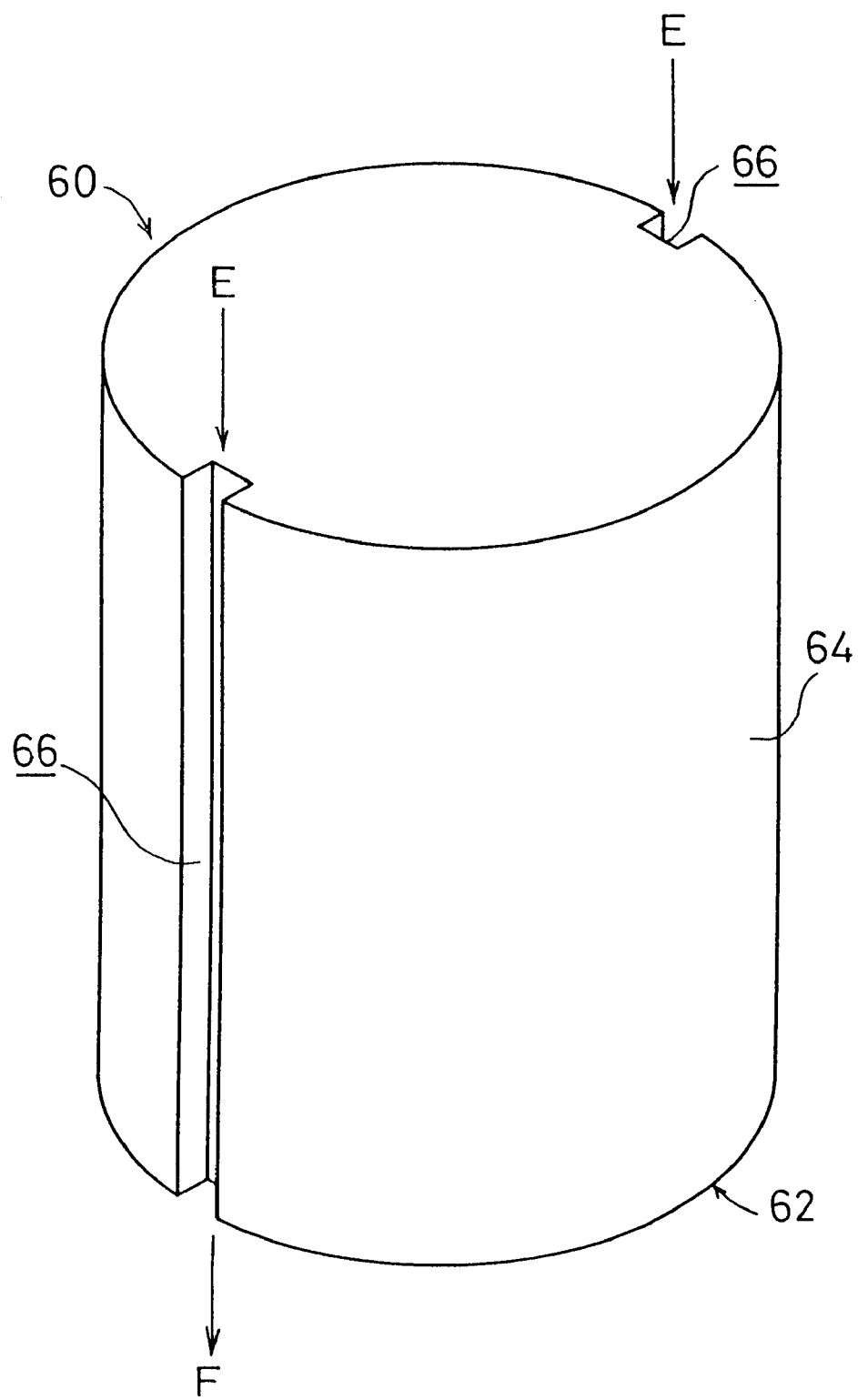
FIG. 8 shows a perspective view illustrating a throttle structure according to the third embodiment.

A throttle structure 60 to be incorporated in the flow meter 58 according to the third embodiment is shown in FIG. 8, for which a columnar member made of stainless steel is used as a substrate 62. Grooves 66, which extend in the longitudinal direction, are formed by means of etching on an outer circumferential surface 64 of the substrate 62. Therefore, the fluid R flows in the direction of the arrow E and in the direction of the arrow F as shown in FIG. 8.

The use of the columnar member as the substrate 62 of the throttle structure 60 makes it possible to correctly ensure the passages for the fluid R. It is possible to improve the measurement accuracy for the minute flow rate of the fluid R passing through the grooves 66 formed on the throttle structure 60.

Modified embodiments of the throttle structure 60 to be used in the third embodiment will be explained with reference to FIGS. 9 and 10.

Figure 9:
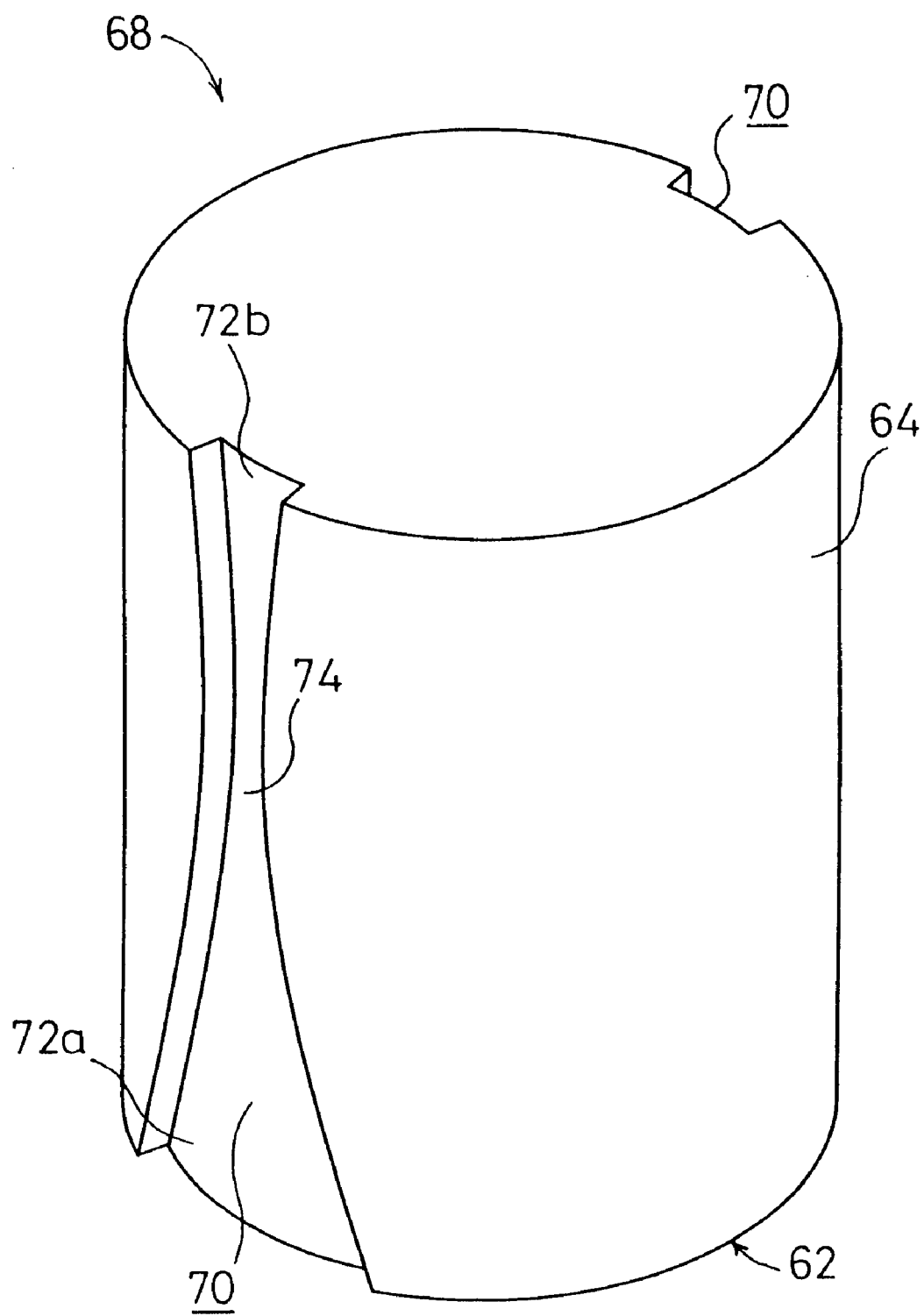
FIG. 9 shows a perspective view illustrating a first modified embodiment of the throttle structure according to the third embodiment.

In the first modified embodiment 68, as shown in FIG. 9, grooves 70, which extend in the longitudinal direction and which have their expanded both ends 72a, 72b, are formed by means of etching on an outer circumferential surface 64 of a substrate 62. The groove 70 has a venturi structure in which the both ends 72a, 72b are expanded, and a substantially central portion 74 of the groove 70 is narrowed as compared with the both ends 72a, 72b. Therefore, when the fluid R passes through the groove 70, the throttling effect for the fluid R is improved. Thus, it is possible to correctly measure the minute flow rate.

Figure 10:
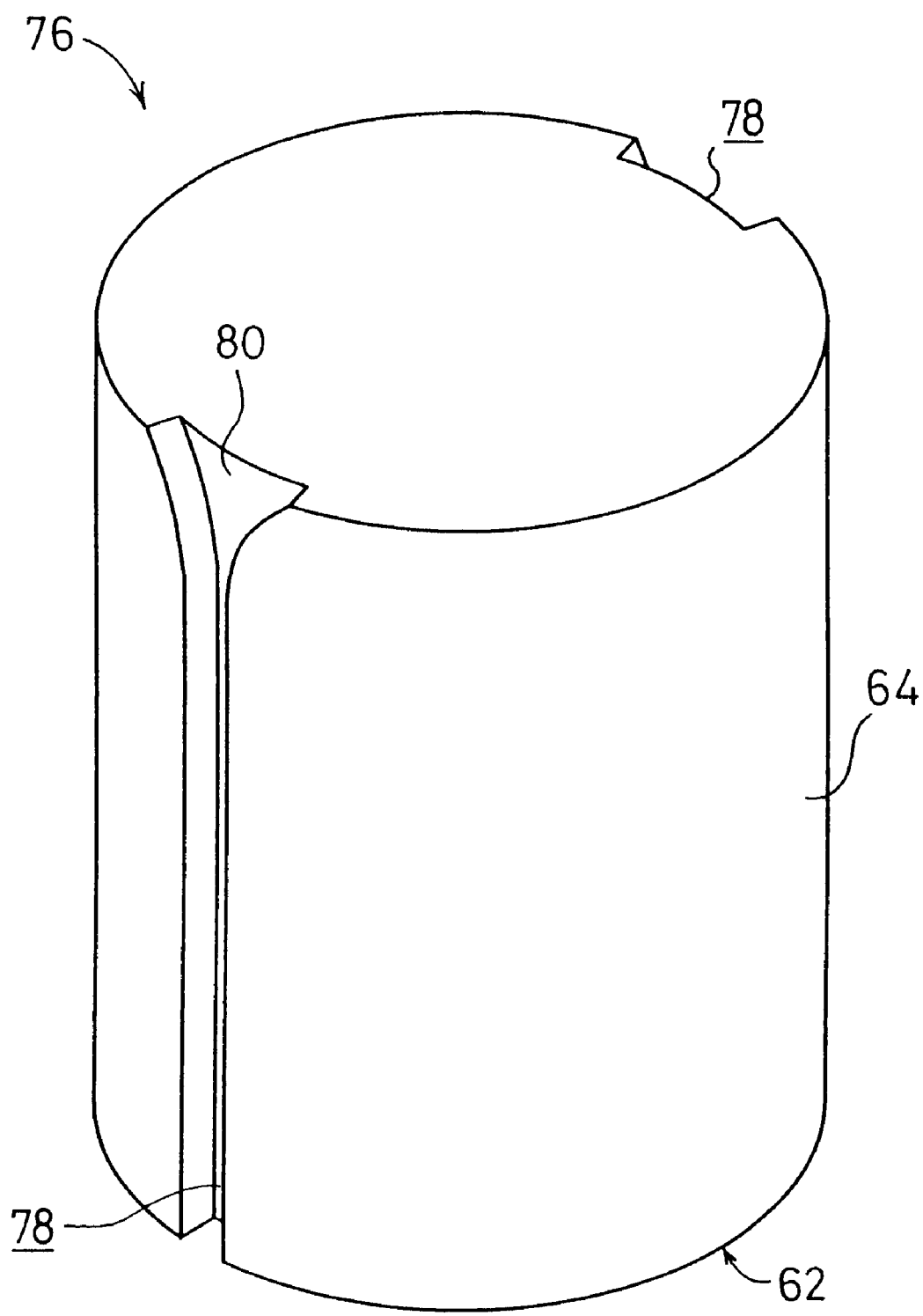
FIG. 10 shows a perspective view illustrating a second modified embodiment of the throttle structure according to the third embodiment.

In the second modified embodiment 76, as shown in FIG. 10, grooves 78, which extend in the longitudinal direction and which have their expanded first ends, are formed by means of etching on an outer circumferential surface 64 of a substrate 62. The fluid R enters the groove 78 from an expanded section 80 of the groove 78, and it passes through the groove 78. Therefore, the fluid R can smoothly pass through the groove 78, and it is possible to reduce the measurement error for the minute flow rate.

Figure 11:
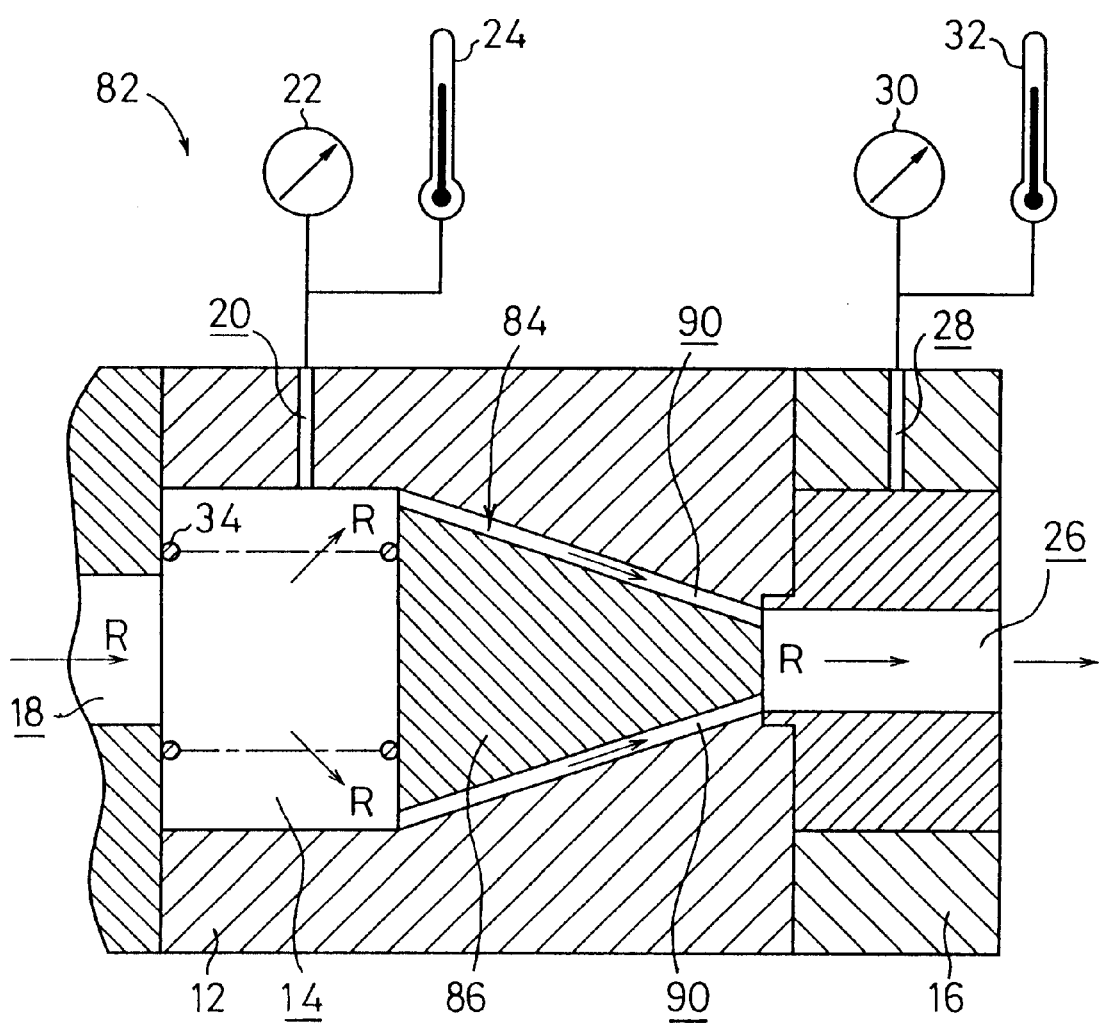
FIG. 11 shows a longitudinal sectional view illustrating a flow meter according to a fourth embodiment.

Next, a flow meter 82 according to a fourth embodiment of the present invention will be explained with reference to FIGS. 11 and 12.

Figure 12:
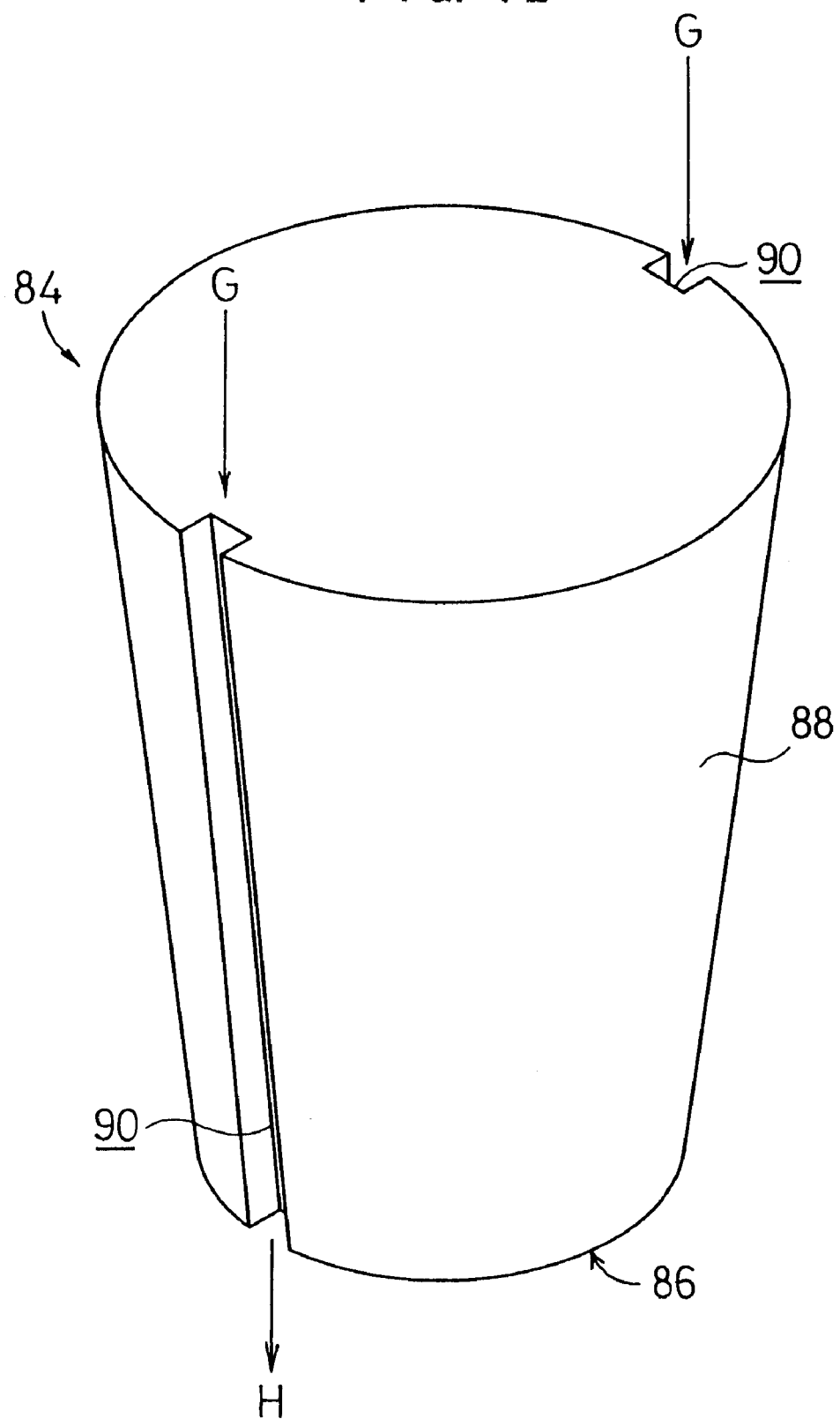
FIG. 12 shows a perspective view illustrating a throttle structure according to the fourth embodiment.

As shown in FIG. 12, a substantially truncated cone made of stainless steel, in which the diameter is continuously decreased toward one end, is used as a substrate 86 for a throttle structure 84 incorporated in the flow meter 82 according to the fourth embodiment. Grooves 90, which extend in the longitudinal direction, are formed by means of etching on an outer circumferential surface 88 of the substrate 86. Therefore, the fluid R flows in the direction of the arrow G and in the direction of the arrow H as shown in FIG. 12.

The substantially truncated cone member, in which the diameter is continuously decreased toward the one end, is used as the substrate 86 of the throttle structure 84. Accordingly, it is possible to correctly ensure the passages for the fluid R, and it is possible to improve the measurement accuracy for the minute flow rate of the fluid R passing through the groove 90 formed on the throttle structure 84.

Modified embodiments of the throttle structure 84 to be used in the fourth embodiment will be explained with reference to FIGS. 13 and 14.

Figure 13:
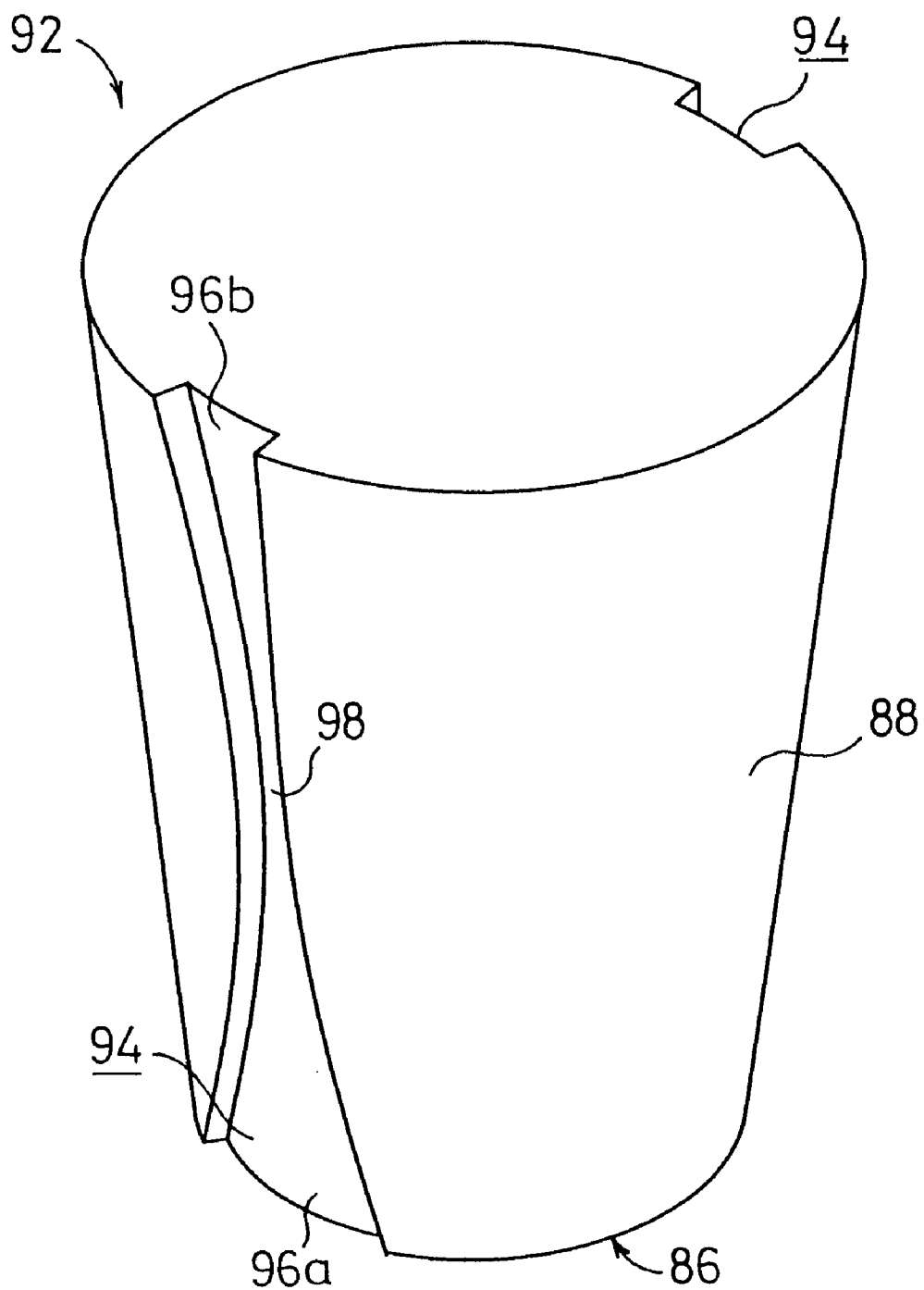
FIG. 13 shows a perspective view illustrating a first modified embodiment of the throttle structure according to the fourth embodiment.

In the first modified embodiment 92, as shown in FIG. 13, grooves 94, which extend in the longitudinal direction and which have their expanded both ends 96a, 96b, are formed by means of etching on an outer circumferential surface 88 of a substrate 86. The groove 94 has a venturi structure in which the both ends 96a, 96b are expanded, and a central portion 98 of the groove 94 is narrowed as compared with the both ends 96a, 96b. Therefore, when the fluid R passes through the groove 94, the throttling effect for the fluid R is improved. Thus, it is possible to correctly measure the minute flow rate.

Figure 14:
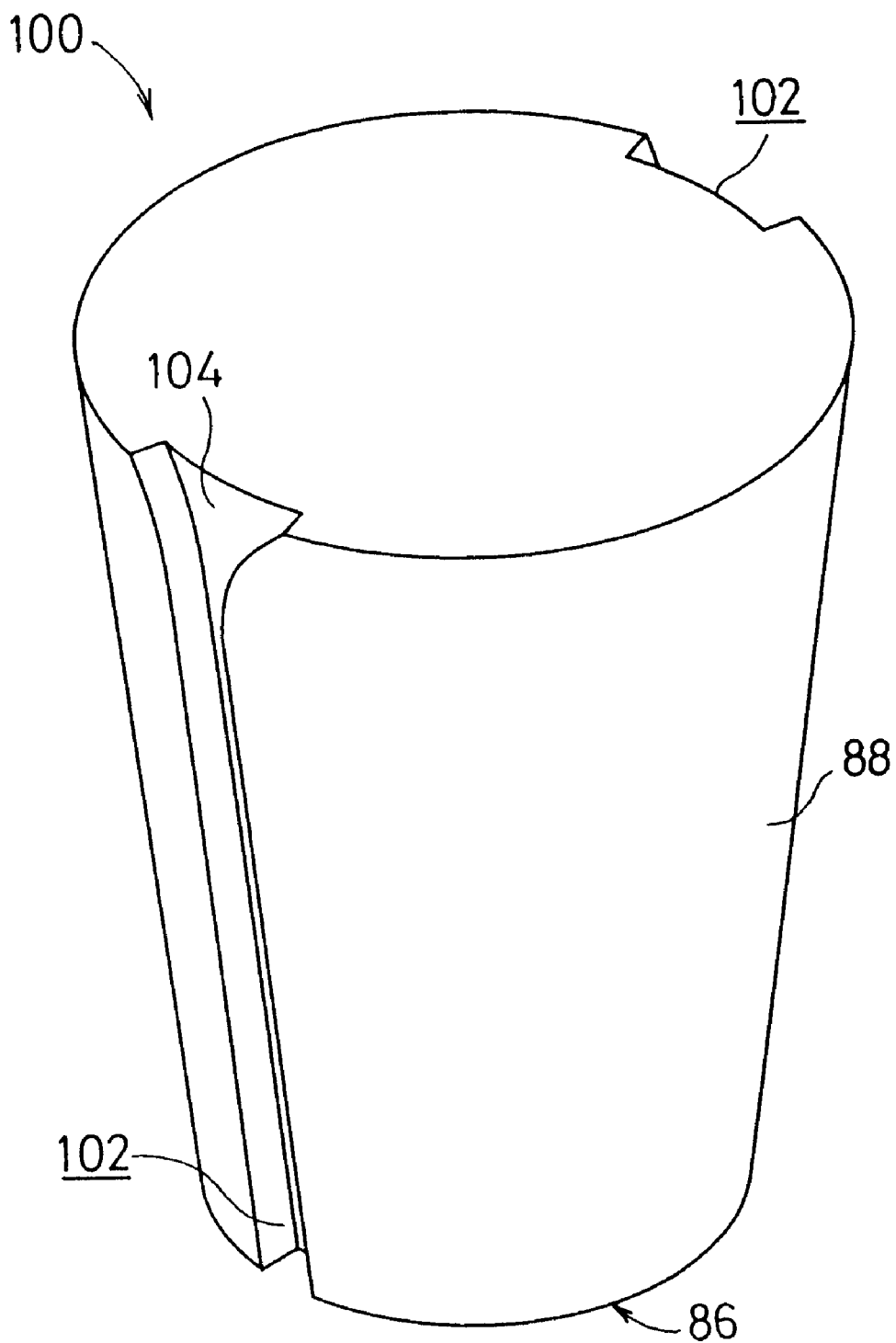
FIG. 14 shows a perspective view illustrating a second modified embodiment of the throttle structure according to the fourth embodiment.

In the second modified embodiment 100, as shown in FIG. 14, grooves 102, which extend in the longitudinal direction and which have their expanded first ends, are formed by means of etching on an outer circumferential surface 88 of a substrate 86. The fluid R enters the groove 102 from an expanded section 104 of the groove 102, and it passes through the groove 102. Therefore, the fluid R can smoothly pass through the groove 102, and it is possible to reduce the measurement error for the minute flow rate.

A flow meter 106 according to a fifth embodiment will be explained with reference to FIGS. 15, 16A, and 16B.

A throttle structure 108 is incorporated at the inside of the flow meter 106. As shown in FIGS. 16A and 16B, the throttle structure 108 comprises a plurality of substrates 110 each of which has an opening 112 provided at a central portion and each of which has grooves 116 formed radially on a surface 114 around the center of the opening 112, the substrates 110 being stacked so that the grooves 116 are not overlapped with each other, with a closure plate 118 which is superimposed at the tail of the substrate 110.

Figure 15:
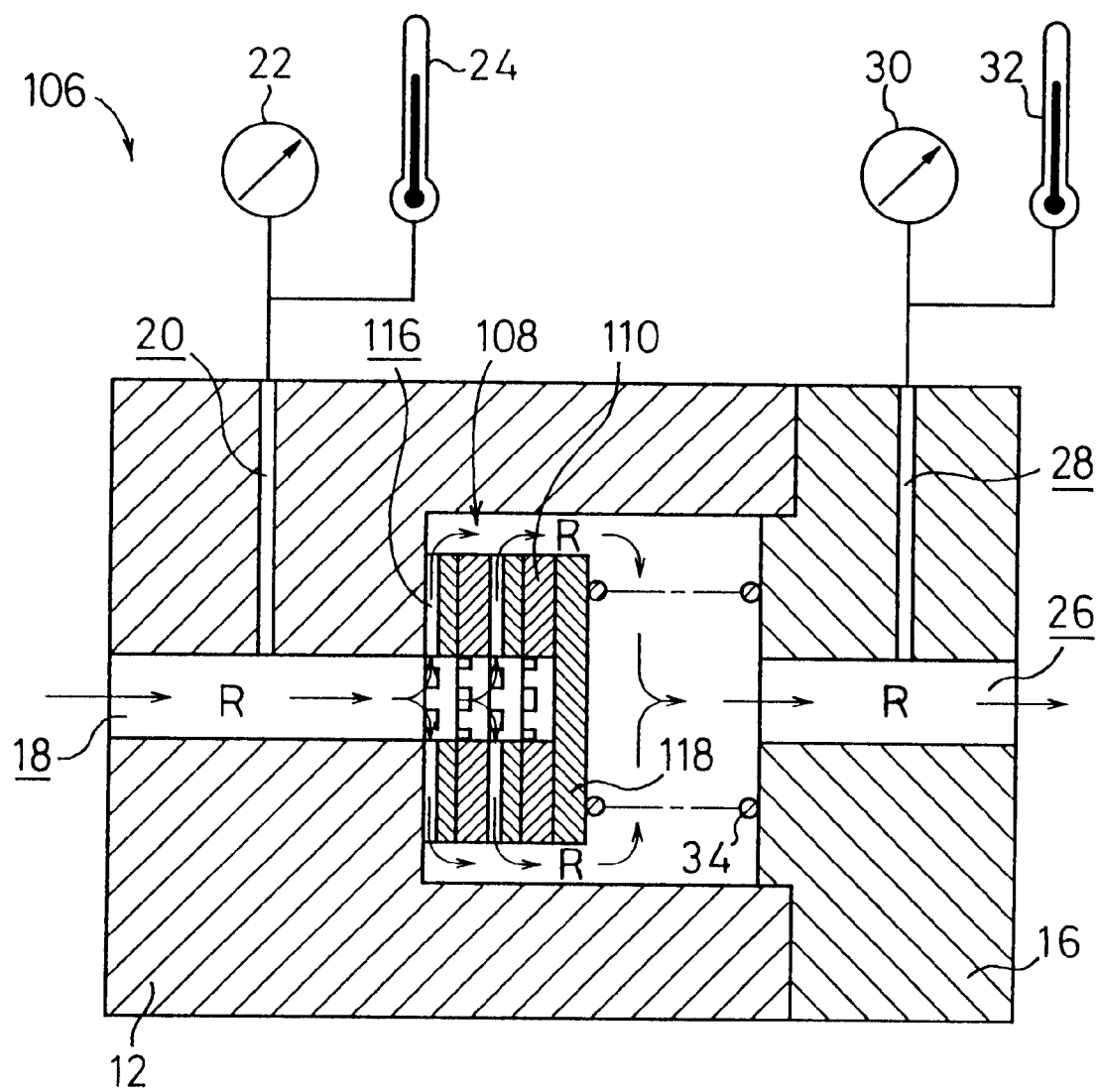
FIG. 15 shows a longitudinal sectional view illustrating a flow meter according to a fifth embodiment.
Figure 16A:
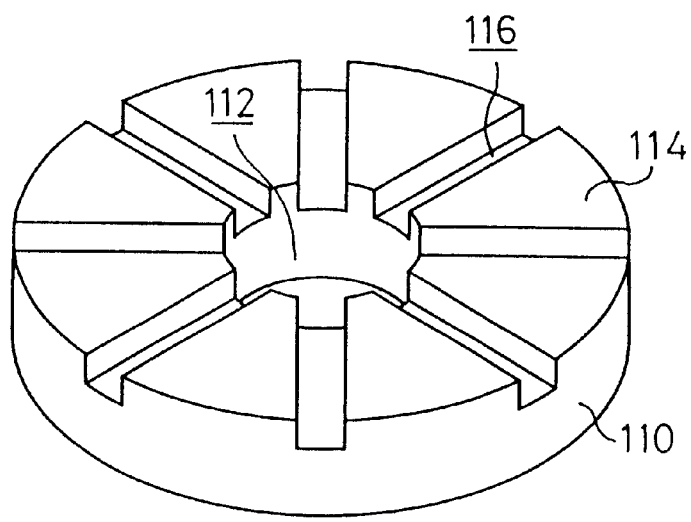
FIG. 16A shows a perspective view illustrating a substrate for constructing a throttle structure according to the fifth embodiment.

As shown in FIG. 15, the throttle structure 108, which comprises the plurality of substrate 110 stacked in the longitudinal direction of the casing 12 and the closure plate 118 superimposed at the tail of the substrate 110, is provided at the inside of the chamber 14 formed in the casing 12. A first end of a coil-shaped spring 34 provided at the inside of the chamber 14 is seated on a first side surface of the lid 16, and a second end of the spring 34 is seated on an end surface of the closure plate 118.

Figure 16B:
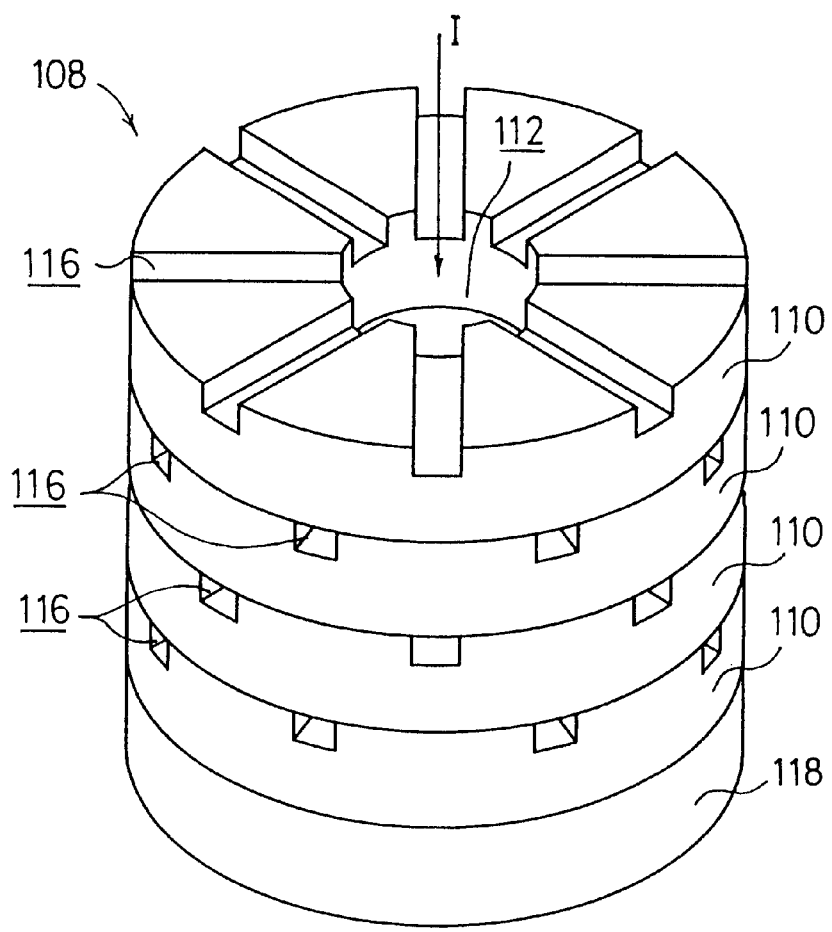
FIG. 16B shows a perspective view illustrating the throttle structure.
Figure 17:
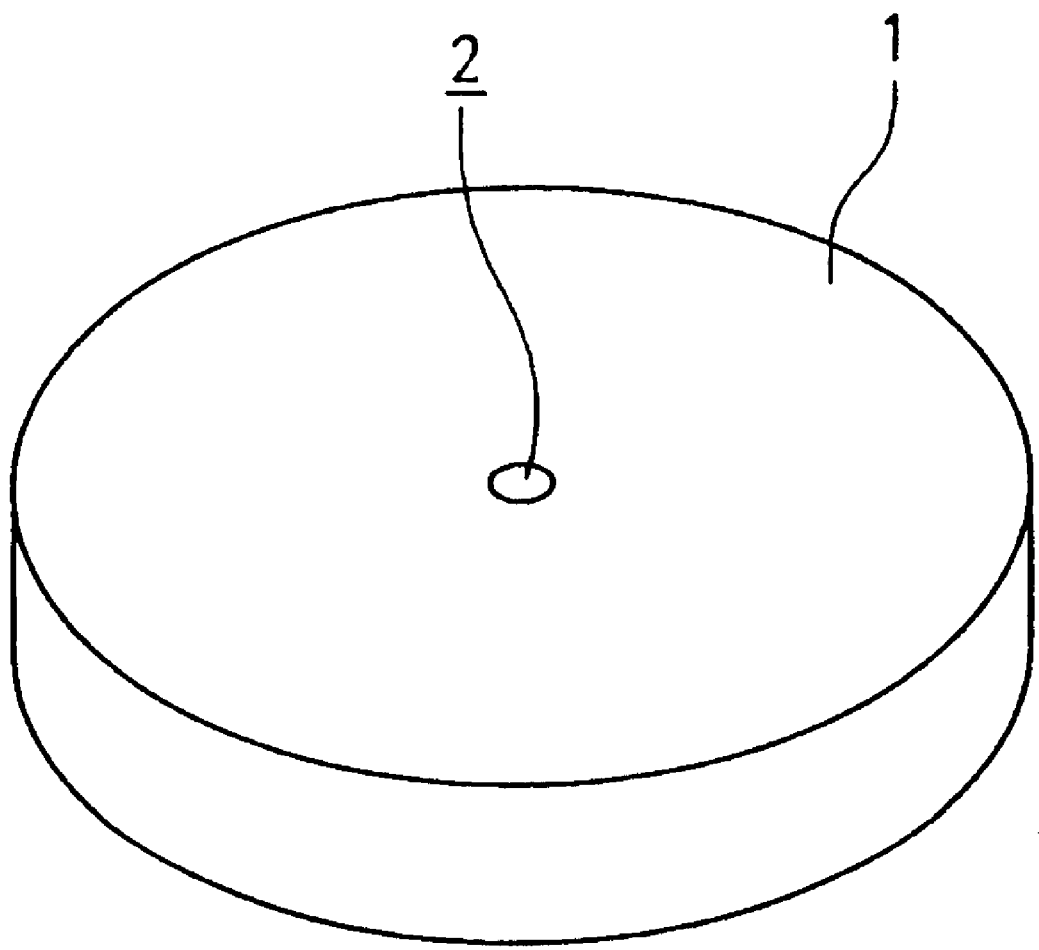
FIG. 17 shows a perspective view illustrating a throttle structure incorporated in a conventional flow meter.

Therefore, the fluid R passes through the inside of the opening 112 in the direction of the arrow I as shown in FIG. 16B, and it is discharged from the groove 116. When the fluid R passes through the throttle structure 108, the throttling effect is further improved, for example, as compared with a case in which the fluid R passes through one substrate 110, because the plurality of substrates 110 are stacked. Accordingly, it is possible to correctly measure the minute flow rate of the fluid passing through the fluid passage.

What is claimed is:

1. A throttle structure comprising:
   a casing having a fluid chamber defined therein;
   a throttle structure arranged in said fluid chamber, which allows a fluid passing through said fluid chamber to flow therethrough, said throttle structure comprising a substrate and a groove formed in said substrate; and
   a spring member urging said throttle structure toward a wall of said casing,
   wherein said fluid passes through said groove while said throttle structure is held against said wall by said spring member.

2. The throttle structure according to claim 1, wherein said groove is formed by means of etching.

3. The throttle structure according to claim 2, wherein said substrate is a flat plate.

4. The throttle structure according to claim 3, wherein said groove is formed, in an integrated manner, with a groove having a narrow width, said groove being formed linearly to extend in a diametric direction on a surface of said substrate, and expanded grooves each of which is formed to have a semicircular configuration in a direction perpendicular to said groove at a substantially central portion of said groove.

5. The throttle structure according to claim 3, wherein said groove is formed linearly to extend in a diametric direction on a surface of said substrate.

6. The throttle structure according to claim 3, wherein said groove is formed linearly to extend in a diametric direction on a surface of said substrate, one end of said groove being expanded.

7. The throttle structure according to claim 3, wherein said groove is formed linearly to extend in a diametric direction on a surface of said substrate, with its both ends being expanded.

8. A flow meter incorporated with a throttle structure comprising:

a casing having a fluid chamber defined therein;

a fluid passage in communication with said fluid chamber, said flow meter measuring a flow rate of a fluid passing through said fluid passage;

a throttle structure arranged in said fluid chamber, which allows a fluid passing through said fluid chamber to flow therethrough, said throttle structure comprising a substrate and a groove formed on a surface of said substrate; and a spring member urging said throttle structure toward a wall of said casing, wherein said fluid passes through said groove while said throttle structure is held against said wall by said spring member, and wherein said flow rate of said fluid is measured by detecting pressures and temperatures of said fluid on an inflow side and an outflow side of said casing.

9. The flow meter incorporated with said throttle structure according to claim 1, wherein said groove is formed by means of etching.

10. The flow meter incorporated with said throttle structure according to claim 8, wherein pressure gauges and thermometers are installed on said inflow side and said outflow side of said casing.

11. The flow meter incorporated with said throttle structure according to claim 9, wherein said substrate is a flat plate.

* * * * *